US007415135B2

(12) United States Patent  
Tevs et al.

(10) Patent No.: US 7,415,135 B2  
(45) Date of Patent: Aug. 19, 2008

(54) OPTICAL SENSOR TO MEASURE THE RELATIVE POSITIONS OF TWO ELEMENTS SUCH AS THE STROKE POSITION OF A HYDRAULIC CYLINDER

(75) Inventors: Nikolai R. Tevs, Winnipeg (CA); Philip J. Kroeker, Winnipeg (CA); Jason Sean Gilmore, Winnipeg (CA)

(73) Assignee: Vansco Electronics LP, Winnipeg, Manitoba (CA)

( * ) Notice: Subject to any disclaimer, the term of this patent is extended or adjusted under 35 U.S.C. 154(b) by 1017 days.

(21) Appl. No.: 10/830,487

(22) Filed: Apr. 23, 2004

(65) Prior Publication Data

US 2005/0238204 A1 Oct. 27, 2005

(51) Int. Cl.  
*G06K 9/00* (2006.01)
(52) U.S. Cl. .................................................. 382/106
(58) Field of Classification Search ................ 382/106, 382/107

See application file for complete search history.

(56) References Cited

U.S. PATENT DOCUMENTS 5,692,404 A * 12/1997 Kirii et al. .................... 72/15.1  
6,697,501 B2 * 2/2004 Tevs et al. .................... 382/107  
2002/0064300 A1  5/2002 Tevs et al.

* cited by examiner

Primary Examiner—Tom Y Lu  
(74) Attorney, Agent, or Firm—Adrian D. Battison; Michael R. Williams; Ryan W. Dupuis

(57) ABSTRACT

A signal indicative of a distance from a first element to a second element, such as the end face of a piston from the end wall of its cylinder, is generated by providing an optical imager carried on a housing that is fixed on the end wall with the optical imager pointed to the end face. An image processor is arranged to identify image components, such as the end nut on the piston, from the acquired images of the first element. From the location of the nut the processor can identify the location of the outer edge of the circular end face and can determine the area of the end face in the image by counting pixels within the area. From the measured area as it appears in the image the distance can be calculated. The end face is illuminated by a light source shining through a light pipe passing through a drilled hole in the end wall. Characteristic markings can be applied on the end face for measuring distance when the nut is too close to be visible.

37 Claims, 5 Drawing Sheets

OPTICAL SENSOR TO MEASURE THE RELATIVE POSITIONS OF TWO ELEMENTS SUCH AS THE STROKE POSITION OF A HYDRAULIC CYLINDER

This invention relates to a sensor used to determine the relative position of two elements such as the stroke position of a hydraulic cylinder and to transmit the information to a control unit.

BACKGROUND OF THE INVENTION

The present invention is primarily concerned with detection of the relative positions of a piston and cylinder of a hydraulic or similar cylinder so that a value can be provided to a control system using the cylinder of the current location of the piston in the cylinder and thus the current location of an object controlled by that cylinder. However many of the principles disclosed herein can be used in detection of the distance between any two elements and the present application is therefore not limited to hydraulic cylinders.

The provision of a value representing displacement of a cylinder can be used in a system controlling the cylinder for many different end uses and purposes. One such purpose is for safety to ensure that the cylinder and theus the object is not moved to a specific location in dangerous circumstances such as when a door is open. Another such purpose is to provide interaction between different functions so that another element is controlled in dependence upon the specific location of a cylinder and thus the object, such as to maintain a bucket level as an arm is raised, for which function the location of the arm must be known.

The current technology used to measure hydraulic cylinder stroke position requires a hole be drilled the length of the cylinder shaft or the piston rod (gun drilling) and the sensor installed within. Repair, replacement or retrofit with this type of sensor is not practical as a serviced part. This arrangement is expensive and ineffective so that it has not yet met significant commercial success.

Some attempts have been made to use techniques using reflected sound waves and resonant frequencies but this technique is temperature dependent thus requiring temperature detection and compensation calculations so that the technique has not lead to any success.

In Published US Application 2002-0064300 of the present Assignees published May 30, 2002 there is described a method for detecting relative displacement between an object such as a slow moving vehicle and an illuminated surface which is normally the ground surface illuminated by an infrared light source so as to provide an output indicating the displacement or a velocity calculated from the displacement. The method includes providing an array of CCD or similar elements each arranged to receive light from a portion of a field of view and to provide an output responsive thereto. The method involves selection of a reference image and repeatedly comparing the reference image of the surface with each successive image by calculating the convolution integral of the signals using a fast Fourier transform to obtain a probable displacement value. The reference image is maintained as long as possible until a "Q" factor falls below an acceptable minimum, or until a predetermined time elapses or until a predetermined displacement is measured. The displacement values obtained from the comparisons can be filtered by discarding some values if they are outside an expected range of probable values.

SUMMARY OF THE INVENTION

It is one object of the invention to provide a sensor used to determine the relative position of two elements.

According to one aspect of the invention there is provided an apparatus for providing a signal indicative of a distance from a first element to a second element comprising:

a housing for attachment to the second element;

an optical imager carried on the housing that is fixed on the second element with the optical imager pointed to the first element;

an image processor for receiving an image signal of acquired images from the optical imager;

the image processor being arranged to identify image components on the first element from the acquired images of the first element, to determine the image dimensions of the image components and to calculate from the image dimensions the distance between the elements; and a communication element that reports the calculated distance to a system controller.

According to a second aspect of the invention there is provided a combination comprising:

a cylinder having an end wall;

a piston mounted within the cylinder for longitudinal movement therealong so as to change the distance of an end face of the piston from the end wall of the cylinder;

and an apparatus for providing a signal indicative of a distance from the end face of the cylinder to the end face of the piston comprising:

a housing arranged to be mounted at the cylinder;

an optical imager fixed on the end wall of the cylinder with the optical imager pointed to the end face of the piston;

an image processor for receiving an image signal of acquired images from the optical imager;

the image processor being arranged to identify image components on the end face of the piston from the acquired images of the end face of the piston, to determine the image dimensions of the image components and to calculate from the image dimensions the distance between the end face of the piston and the end wall of the cylinder; and a communication element that reports the calculated distance to a system controller.

The following optional features are particularly applicable to the arrangement where the device is used for a cylinder and piston combination but can be used in other situations as required.

Preferably the apparatus includes a light source arranged to be mounted on the end wall of the cylinder that is aligned with the imager and illuminates the end face of the piston. The light source is required in situations where the first element is insufficiently illuminated such as in the interior of the cylinder but also in many other enclosed situations where the natural illumination is obscured or absent.

Preferably all components are assembled into a single structure at the housing so that a single housing can be mounted on the second element. However the individual components may be separately housed. Parts of the system may be located on the second element or remote from the second element.

In a particularly convenient arrangement for use particularly with the cylinder and piston, but also usable in any situation where the housing is to be mounted on an end plate, there is provided a light pipe arranged to extend through a hole in the end wall to deliver images of the end face to the imager.

Where it is not suitable for illumination and the image to pass through a single light pipe common to both there can be provided a first light pipe arranged to extend through a first hole in the end wall to deliver illumination from a light source outside the hole to the end face and a second light pipe arranged to extend through a second hole in the end wall to deliver images of the end face to the imager outside the hole.

Preferably the image processor is arranged to analyze the acquired image and determine therefrom at least one visible component on the end face that is suitable for distance calculation.

Preferably the light source is arranged to increase light intensity as the distance of the end face from the end wall increases to maintain at least a minimum acceptable illumination.

Preferably the light source communicates the light therefrom through a light pipe and wherein the light pipe is arranged with an end surface defining an area which is generally illuminated to avoid point source illumination, thus reducing reflections and bright spots on the image.

Preferably there is provided an input for calibration data wherein the calibration data relates either to actual measurements of distances of the piston relative to the cylinder or to parameters such as diameter or length or manufacturers identifying information of the piston and cylinder.

Preferably the image processor is arranged in a first process to cancel bright spots on the image.

Preferably the image processor is arranged to select from the image a characteristic part of the image of the end face, that is a component on the end face which has a characteristic shape which can be readily distinguished from other shapes. This may be in the example of the piston head, the end nut which has the characteristic hexagon shape allowing its location to be accurately determined from at least a side and two angles.

Preferably the image processor is arranged to use the selected characteristic part to locate a specific component, such as the circular end face of the piston, having a predetermined characteristic dimension of the second element. That is the dimension of the characteristic part has a predetermined well known and fixed dimension which can be compared on the image to determine its distance.

Preferably, having determined the location on the image of the characteristic part, the image processor is arranged to determine the image dimensions of the image components by determining the area of the characteristic part, that is in the example concerned the end face of the piston, on the image.

Preferably the image processor is arranged to determine the image dimensions of the image components by determining the number of pixels of the image thereof within a boundary thereof, that is a sum which is directly proportional to the area. This counting of pixels in an area reduces the errors possible if only a single dimension were calculated.

In some cases where the whole of the area of interest is not on the image, the image processor is arranged to determine the number of pixels by extrapolating to include areas of the components which are outside the field of view.

Preferably the apparatus is arranged such that the end face of the piston is a matt surface to reduce bright spots from reflections.

In some cases it is desirable to provide additional markings on the end face to provide characteristics which are readily discernible on the image. This may be necessary where the element concerned has no distinguishing features which allow the area of interest to be readily determined or if the piston is too close to the end wall for the imager to discern visible components of the end face Conveniently the markings may be concentric circles with a characteristic spacing which allows them to be readily distinguished and their area to be determined by the above technique.

Preferably the image processor is arranged to select different components on the end face as the areas of interest depending upon the distance of the end face from the end wall.

The arrangement described herein thus provides an optical sensor array will be used to capture an image of the piston features (piston face) (blank end), (rod nut and rod end). Using image-processing techniques, the image size of the piston features can be determined and compared with their physical dimensions. The piston distance from the optical sensor will be calculated from the comparison and transmitted to the control unit.

The sensor is installed from the outside of the cylinder, through a threaded hole in the blank end of the cylinder. The sensor installation will not require extensive cylinder modifications. The sensor will be field replaceable.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
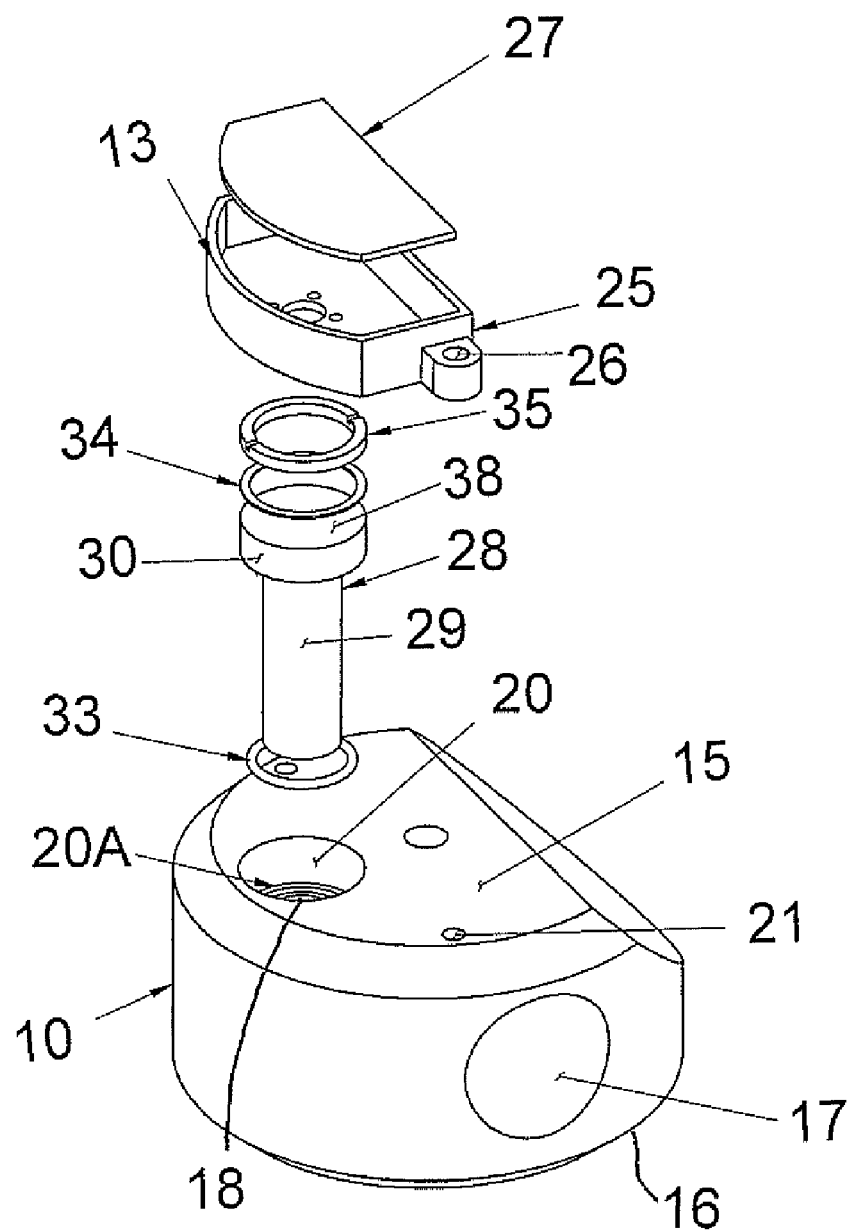
FIG. 1 is an exploded view showing an end cap of a cylinder including a distance measurement sensor according to the present invention mounted thereon.

The distance measuring device disclosed herein is primarily intended for measuring in real time the relative locations of a cylinder head 10 of a cylinder 11 and a piston 12 within the cylinder 11. This measurement provides a specific distance between the cylinder head and the piston so as to be able to provide to control equipment a specific location of the piston within the cylinder allowing accurate control of the cylinder.

The distance measuring device comprises a measuring apparatus 13 mounted on the cylinder head for detecting the distance from a front face 14 of the piston 12. Thus the cylinder head 10 forms one element and the front face 14 forms a second element so that the distance therebetween is measured. It will be appreciated that, while the arrangement disclosed herein is primarily concerned with cylinders and the piston mounted therein, it can be used in any other field where two elements move relative to one another along a predetermined axis so as to increase and decrease the spacing therebetween.

Figure 2:
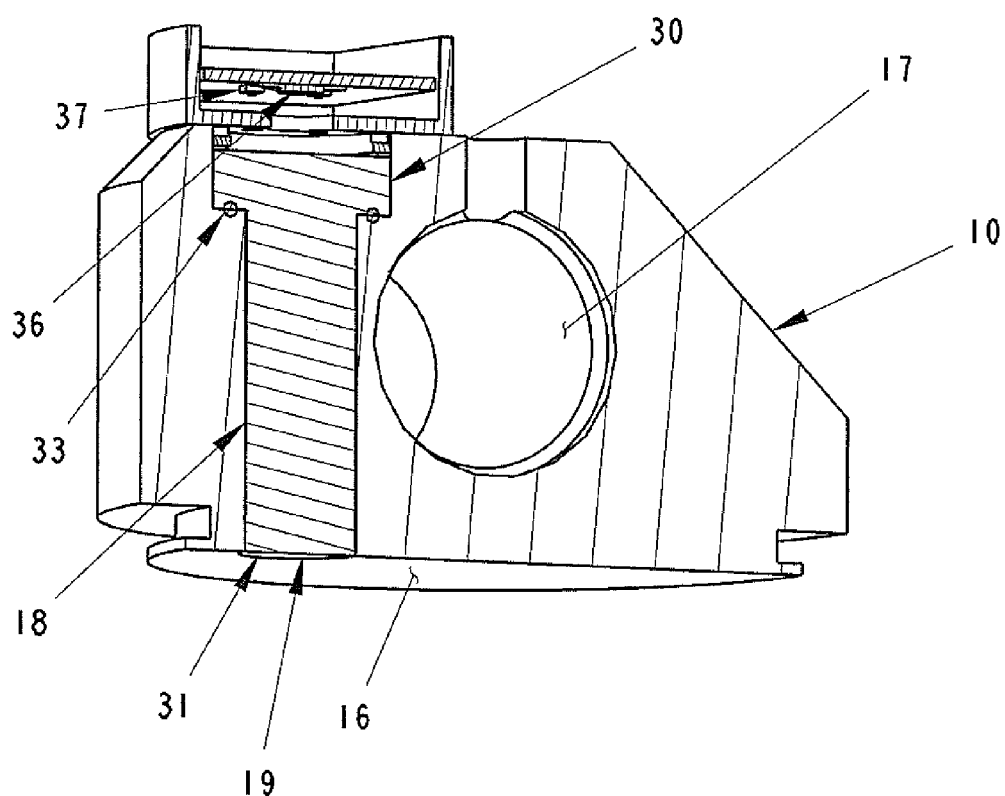
FIG. 2 is a cross sectional view of the cylinder head of FIG. 1.
Figure 3:
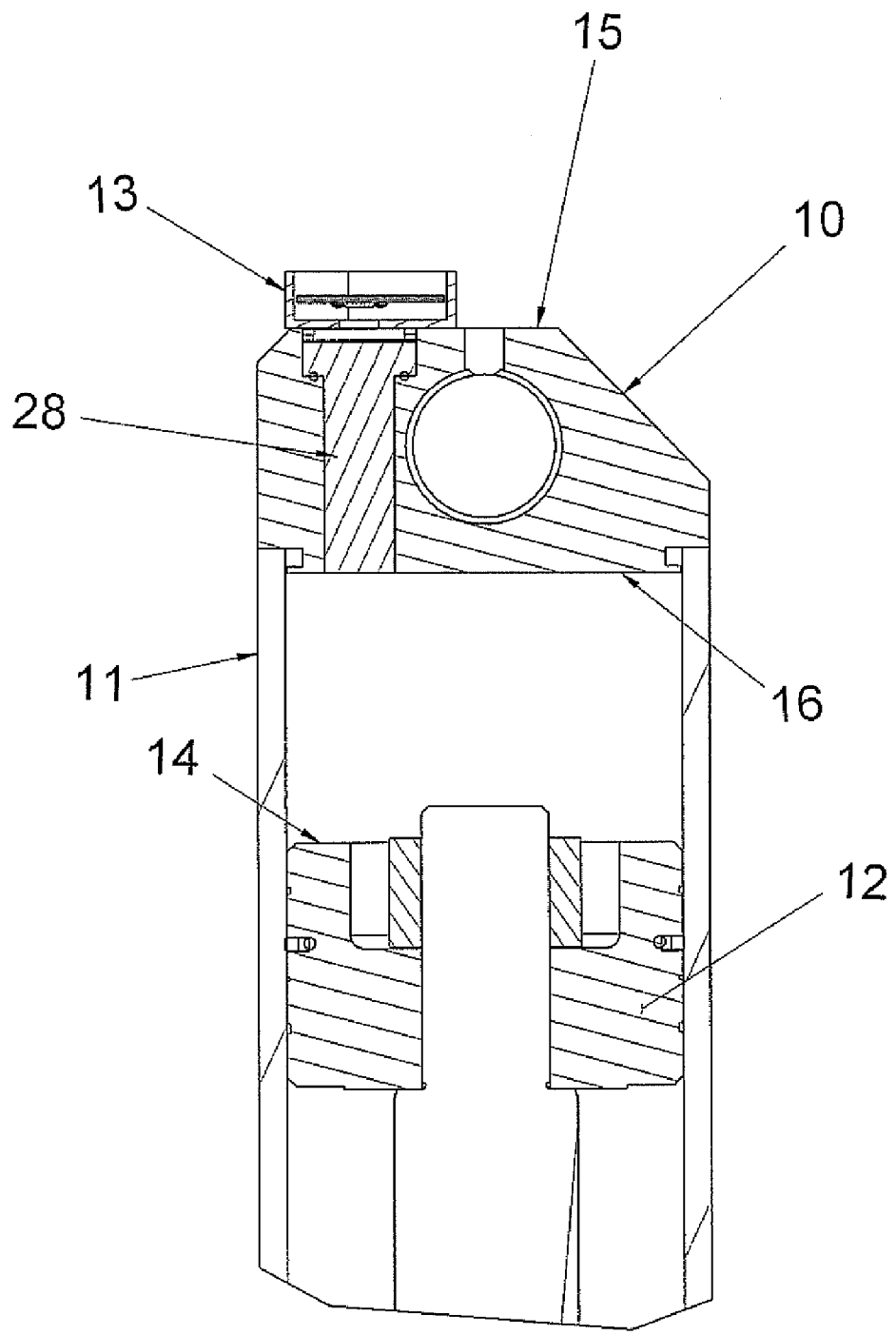
FIG. 3 is a schematic cross sectional view showing the mode of operation of the sensor of FIG. 1.

The apparatus is shown in more detail in FIGS. 1 and 2 where the cylinder head 10 is shown in more detail and includes an end face 15 outside the cylinder and an end face 16 within the cylinder and closing the end of the cylinder. Through the end cap 10 is provided a bore 17 which defines a mounting for the end of the cylinder for attachment to a pivot pin in conventional manner.

A bore 18 is formed through the end cap 10 at a position offset from a center of the end cap so as to pass through the end cap to one side of the bore 17. And end face 19 of the bore 18 breaks out on the surface 16. A counter bore 20 of larger diameter is formed co-axial with the bore 18 at the surface 15. A bore 21 is formed at the center of the end cap and breaks out on the surface 15 and at the bore 17. The end cap 10 thus forms a modified end cap which is manufactured with the above elements and is used in replacement for a conventional end cap on a conventional cylinder and fastened to the end of the cylinder in a conventional manner.

The distance measuring device comprises a mounting body 25 which is arranged to be clamped onto the end face 15 of the end cap. The body includes a threaded opening 26 by which it can be fastened to the bore 21 by a threaded fastener which passes through the opening 26 and into the bore 21 to provide a threaded coupling holding the housing on the end cap. The housing has a flat bottom surface which sits against the end face 15 and is shaped so that it provides a thin body covering a part of the surface 15 and particularly over the bore 20. The enclosure receives a printed circuit board 27 which is shaped so as to match into the interior of the housing and sit within the interior contained within side walls of the housing and enclosed by suitable enclosure of the housing as is well known to one skilled in the art.

The measuring device further includes a light pipe 28 which is formed of a suitable transparent plastics material which extends into and fills the bores 18 and 20. Thus the light pipe includes a cylindrical portion 29 and a cap portion 30 generally matching the dimensions of the bores 18 and 20. Thus particularly the cylindrical portion 29 has the same diameter as the bore 18 so it is a sliding fit within the bore 18 and has an end face 31 which is circular and located at the bottom surface 16 of the end cap. The cap 30 is slightly shallower than the bore 20 but has an outside diameter matching the bore 20. The end cap thus defines a shoulder 32 for engaging against a shoulder 20A at the end of the bore 20. A sealing ring 33 is provided which is located between the shoulder 32 and the shoulder 20A so as to seal the light pipe in place within the bore and prevent the escape of fluid from within the interior of the cylinder through the bore 18.

The light pipe is held in place by a retaining washer 34 and a threaded retaining ring 35 which threads into a female threaded surface on the bore 20 and clamps the cap 30 of the light pipe down into the bore 20 so as to squeeze the sealing ring 33.

The PCB 27 carries the components as described in more detail herein after including particularly an optical imager 36 and one or more light emitting diodes (LED) 37 which are carried on the underside of the PCB and communicate with a clear window 38 on the upper side of the light pipe 28 thus allowing communication of light from the LED downwardly through the light pipe into the cylinder and reflected light upwardly through the light pipe to the image receiver 36.

Thus in the embodiment shown a single light pipe provides communication of light in both directions including illuminating light from the LEDs and reflected light to the imager. However in some embodiments two separate light pipes can be provided each extending through its own individual bore, depending upon geometry and illumination levels.

In the embodiment with two separate light pipes the illuminating pipe is made of translucent material so that it forms at its end face not a point image of the LED but instead a generalized circular illumination covering the end face of the light pipe. This reduces bright spots in reflected light within the cylinder.

Figure 5:
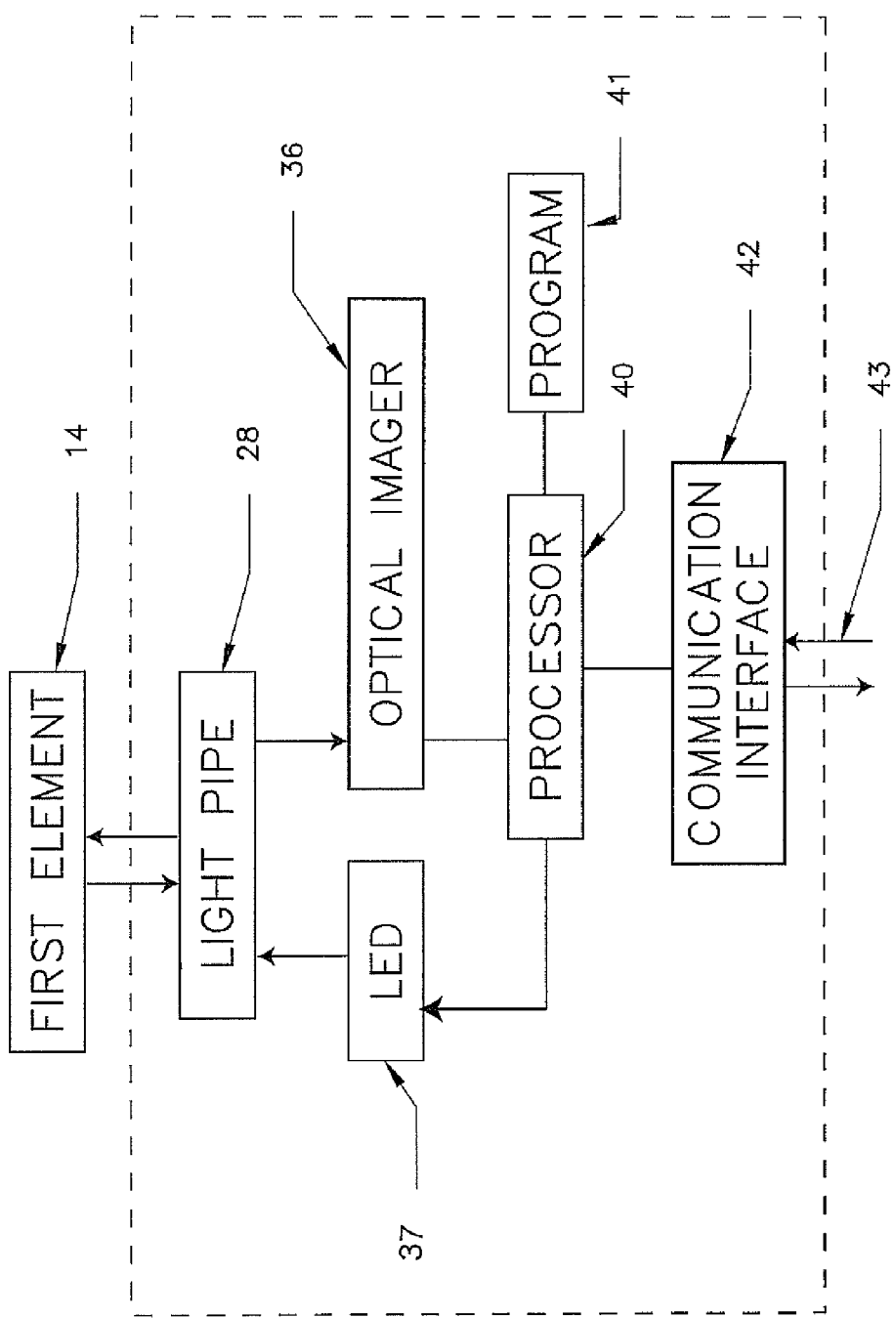
FIG. 5 is a schematic illustration of the combination according to the present invention.

Turning now to FIG. 5, the above components are shown schematically together with a processor 40 which controls the operation of the LED and the optical imager in response to program 41 contained within a memory module of the processor. The processor communicates through a communication interface 42 with exterior components as indicated at 43 so that the data obtained in the processor from the operation of the program can be communicated to external components for operating control of the cylinder. The device operates by the use of the optical imager and the program to analyze the reflected light from the first element which is the end face 14 of the piston to provide an acquired image of the end face 14 and from that image to determine certain image dimensions of the components of that image and to calculate from the image dimensions the distance between the optical imager and the end face 13 and therefore between the end cap 10 and the piston 12.

Figure 4:
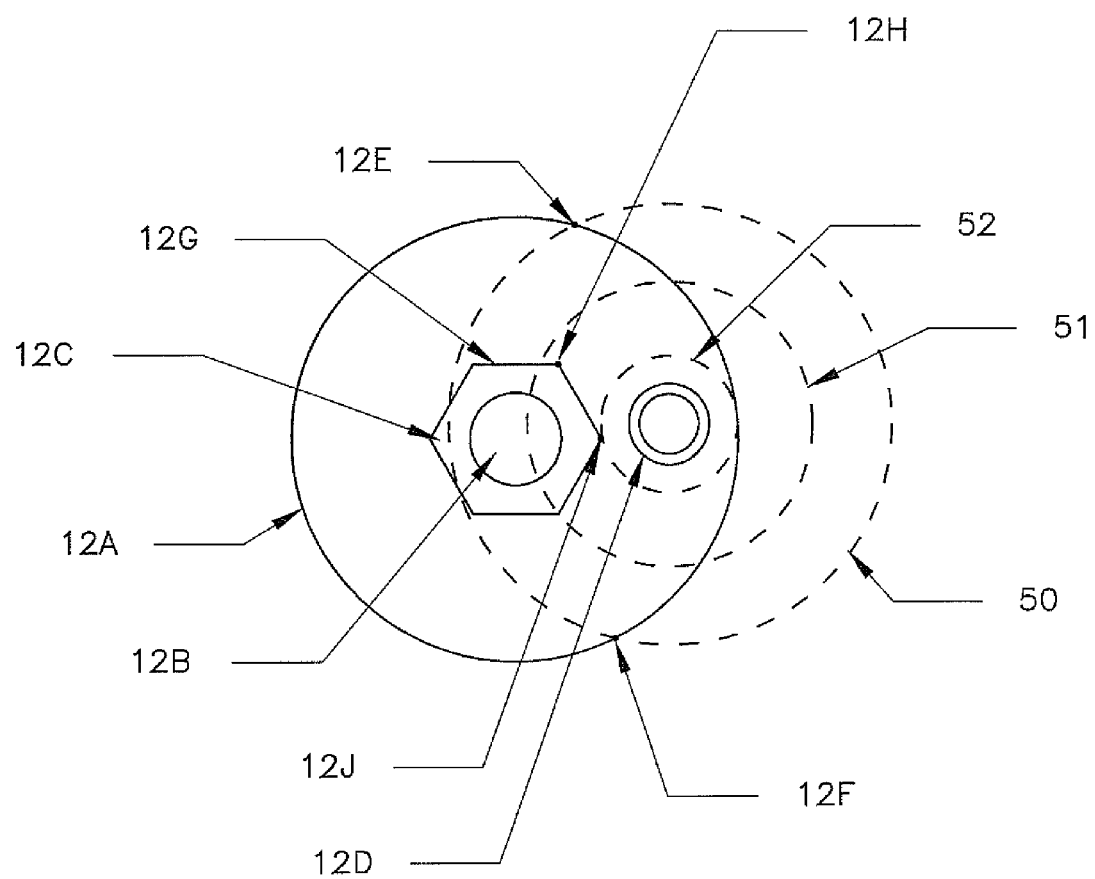
FIG. 4 is an end elevational view of an end face of the piston rod showing a series of images of the end face for analysis.

It will be appreciated in general that the distance between the optical imager and the end face 14 is inversely proportional to the dimensions of components of the image on the optical imager. Thus it is necessary to analyze the image of the end face 14 forming the first element and to acquire a numerical value indicative of the dimensions of those image components to provide a numerical value which is inversely proportional to the distance as shown in FIG. 4 there is illustrated an end face of the piston which includes a peripheral edge 12A, a central circular end face 12B of the piston rod, a hexagonal nut 12C holding the piston onto the end of the rod 12B and markings 12D provided on the end face of the piston. The physical dimensions of all of these components and the dimensions of images of these components acquired by image processing can be used to calculate the distance of the end face 14 of the piston relative to the optical image.

Depending upon the distance of the piston from the optical imager, the whole end face 14 or different amounts of it are visible within the view of the optical imager. Thus in FIG. 4, 3 views are illustrated in dash line at 50, 51 and 52 depending upon the distance of the piston from the optical imager. It will of course be appreciated that when the piston is very close, only a small part such as indicated at 52 of the end face is visible within the range of the optical imager, bearing in mind the dimensions of the light pipe. This view increases as the piston moves away so that when it is a significant distance away, enough of the piston is visible so that the outside edge 12A can be readily determined within the image. Thus as shown for example in the image 50, a portion of the peripheral surface 12A between points 12E and 12F can be determined which is readily determinable from the image in view of the fact that it forms a smooth circular shape. The whole of the end face is not within the image since the image is offset relative to the circular peripheral edge 12A. It will be appreciated that the diameter of the image of the peripheral edge 12A is inversely proportional to the distance from the optical imager.

This diameter is determined by firstly analyzing the area of the end face within the peripheral edge 12A which lies within the image 50. This is determined by counting the number of pixels on the image which are within the circular edge 12A between the points 12E and 12F. The program then carries out an extrapolation from the points 12E and 12F to determine the full area of the end face as it would appear if it were wholly within the image. This area is proportional to the diameter which can thus be readily calculated and thus proportional to the distance of the end face from the imager.

Thus when the piston is sufficiently distanced from the end cap of the cylinder, the analysis is carried out by determining the position of the peripheral edge which can be readily viewed since it is sufficiently clear as a circular image or its part to determine the exact location of the peripheral edge.

However as the piston moves closer to the end cap, the amount of the peripheral edge 12A which is visible becomes decreased so it becomes more difficult to determine from the image exactly which line forms the peripheral edge 12A and what are the exact bounds of this edge. It is necessary therefore to utilize similar technique in order to identify other components of the image. This analysis therefore is carried out using the peripheral edge 12G of the nut 12C and particular the apexes 12H and 12J which are particularly distinct within the image 51. Each apex has a particular angle and is defined by two lines at that angle so that the nut image area can be specifically and accurately determined.

From this area and the physical nut area the distance of the end face from the optical imager can be calculated.

In the event that the piston has moved to a position so that the nut also no longer falls within the image as indicated at 52, a further technique is used to determine dimensions of components on the end face 14. In this technique, additional markings 12D are provided on the end face in the form of two or more concentric circles indicated at 12D. These concentric circles are therefore readily visible within the image and can readily determined from other extraneous elements or components within the image. Having determined the location of the markings 12D, area between the circles on the image can be determined by counting the number of pixels that fall between them. A ratio of areas between the circles in the image can be compared with the physical dimensions of the circles and used to calculate to the distance of the end face from the optical imager. Thus when none of the elements of the end face are visible within the image, additional markings are provided so as to provide visible elements on the end face which can be analysed on the image and their dimensions or area determined.

The program is thus arranged to analyze the image looking for each of the elements of the image in turn to determine which of those elements should be used for the analysis of the diameter or dimension of the particular component concerned.

The end face 14 is preferably rendered matt by sanding or other surface characteristics so as to reduce direct reflections thus reducing bright spots on the image. However reflections occur on the inside surface of the cylinder and on various surfaces at an angle to the end face so that the image viewed contains many bright spots and many reflected shapes thus requiring careful analysis of the image to determine the component which is to be used. Reflections are minimized as much as possible by the use of matt surfaces. Bright spots are cancelled in the processing of the image from the program by initially analyzing the image for those bright spots and using known program characteristics to eliminate initially the bright spots before analysing the image for the components to be determined.

In order to ensure sufficient intensity of the image, the program is arranged to control the current supply to the LED so as to increase or decrease the amount of illumination sufficiently to observe the components of the image. Thus the LED initially is excited to a predetermined value and the intensity of illumination is increased in the event that the program fails to determine any image components for analysis. In the event that, after increase of the illumination to the maximum value, no image components can still be determined, the program is arranged to communicate from the processor through the communication interface a fault signal.

In the analysis of the distance of the piston from the cylinder head, the circular shape of the piston is particularly characteristic and readily visible when the piston is within a certain range. Only when the piston approaches too close to the end cap it is necessary for additional processing arrangements to be utilized. However in other distance measuring devices which are not used with a cylinder, other components may be used on the first element as the element to be analysed. Such elements may not include such a readily visually distinct component such as the circular peripheral face or the nut and thus markings such as the markings 12D may be used as the primary analysis tool.

Since various modifications can be made in my invention as herein above described, and many apparently widely different embodiments of same made within the spirit and scope of the Claims without department from such spirit and scope, it is intended that all matter contained in the accompanying specification shall be interpreted as illustrative only and not in a limiting sense.

The invention claimed is:

1. Apparatus for providing a signal indicative of a distance from a first element to a second element comprising:
    a housing for attachment to the second element;
    an optical imager carried on the housing that is fixed on the second element with the optical imager pointed to the first element;
    an image processor for receiving an image signal of acquired images from the optical imager;
    the image processor being arranged to identify image components on the first element from the acquired images of the first element, to determine the image dimensions of the image components and to calculate from the image dimensions the distance between the elements; and
    a communication element that reports the calculated distance to a system controller.

2. The apparatus according to claim 1 further including a light source arranged to be mounted on the second element that is aligned with the imager and illuminates the first element.

3. The apparatus according to claim 1 wherein all components are assembled into a single structure at the housing.

4. The apparatus according to claim 1 wherein there is provided a light pipe arranged to extend through a hole in the second element to deliver images of the first element to the imager.

5. The apparatus according to claim 1 wherein there is provided a first light pipe arranged to extend through a first hole in the second element to deliver illumination from a light source outside the hole to the first element and a second light pipe arranged to extend through a second hole in the second element to deliver images of the first element to the imager outside the hole.

6. The apparatus according to claim 1 wherein the image processor is arranged to analyze the acquired image and determine therefrom at least one visible component on the first element that is suitable for distance calculation.

7. The apparatus according to claim 2 that wherein the light source is arranged to increase light intensity as the distance of the first element from the second element increases to maintain at least a minimum acceptable illumination.

8. The apparatus according to claim 5 wherein the light source communicates the light therefrom through the first light pipe and wherein the light pipe is arranged with an end face defining an area which is generally illuminated to avoid point source illumination.

9. The apparatus according to claim 1 wherein there is provided an input for calibration data wherein the calibration data relates either to actual measurements of distances or to parameters of the elements.

10. The apparatus according to claim 1 wherein the image processor is arranged in a first process to cancel bright spots on the image.

11. The apparatus according to claim 1 wherein the image processor is arranged to select from the image a characteristic part of the image of the first element.

12. The apparatus according to claim 11 wherein the image processor is arranged to use the selected characteristic part to locate a specific component having a predetermined characteristic dimension of the first element.

13. The apparatus according to claim 12 wherein the selected characteristic part is circular.

14. The apparatus according to claim 1 wherein the image processor is arranged to determine the image dimensions of the image components by determining their area on the image.

15. The apparatus according to claim 1 wherein the image processor is arranged to determine the image dimensions of the image components by determining the number of pixels of the image thereof within a boundary thereof.

16. The apparatus according to claim 15 wherein the image processor is arranged to determine the number of pixels by extrapolating to include areas of the components which are outside the field of view.

17. A combination comprising:
a cylinder having an end wall;
a piston mounted within the cylinder for longitudinal movement therealong so as to change the distance of an end face of the piston from the end wall of the cylinder;
and an apparatus for providing a signal indicative of a distance from the end face of the cylinder to the end face of the piston comprising:
a housing arranged to be mounted at the cylinder;
an optical imager fixed on the end wall of the cylinder with the optical imager pointed to the end face of the piston;
an image processor for receiving an image signal of acquired images from the optical imager;
the image processor being arranged to identify image components on the end face of the piston from the acquired images of the end face of the piston, to determine the image dimensions of the image components and to calculate from the image dimensions the distance between the end face of the piston and the end wall of the cylinder; and
a communication element that reports the calculated distance to a system controller.

18. The combination according to claim 17 further including a light source arranged to be mounted on the end wall of the cylinder that is aligned with the imager and illuminates the end face of the piston.

19. The combination according to claim 17 wherein all components are assembled into a single structure at the housing.

20. The combination according to claim 17 wherein there is provided a light pipe arranged to extend through a hole in the end wall to deliver images of the end face to the imager.

21. The combination according to claim 17 wherein there is provided a first light pipe arranged to extend through a first hole in the end wall to deliver illumination from a light source outside the hole to the end face and a second light pipe arranged to extend through a second hole in the end wall to deliver images of the end face to the imager outside the hole.

22. The combination according to claim 17 wherein the image processor is arranged to analyze the acquired image and determine therefrom at least one visible component on the end face that is suitable for distance calculation.

23. The combination according to claim 18 wherein the light source is arranged to increase light intensity as the distance of the end face from the end wall increases to maintain at least a minimum acceptable illumination.

24. The combination according to claim 21 wherein the light source communicates the light therefrom through the first light pipe and wherein the light pipe is arranged with an end surface defining an area which is generally illuminated to avoid point source illumination.

25. The combination according to claim 17 wherein there is provided an input for calibration data wherein the calibration data relates either to actual measurements of distances of the piston relative to the cylinder or to parameters of the piston and cylinder.

26. The combination according to claim 17 wherein the image processor is arranged in a first process to cancel bright spots on the image.

27. The combination according to claim 17 wherein the image processor is arranged to select from the image a characteristic part of the image of the end face.

28. The combination according to claim 17 wherein the image processor is arranged to use the selected characteristic part to locate a specific component having a predetermined characteristic dimension of the end face.

29. The combination according to claim 17 wherein the selected characteristic part is the circular end face of the piston.

30. The combination according to claim 17 wherein the image processor is arranged to determine the image dimensions of the image components by determining their area on the image.

31. The combination according to claim 17 wherein the image processor is arranged to determine the image dimensions of the image components by determining the number of pixels of the image thereof within a boundary thereof.

32. The combination according to claim 17 wherein the image processor is arranged to determine the number of pixels by extrapolating to include areas of the components which are outside the field of view.

33. The combination according to claim 17 wherein the apparatus is arranged such that the end face of the piston is a matt surface.

34. The combination according to claim 17 wherein there are provided additional markings applied to the end face to provide characteristics which are readily discernible on the image.

35. The combination according to claim 34 wherein the markings are concentric circles with a characteristic spacing.

36. The combination according to claim 34 wherein the image processor is arranged to use the markings only when the piston is too close to the end wall for the imager to discern visible components of the end face.

37. The combination according to claim 28 wherein the image processor is arranged to select different components on the end face depending upon the distance of the end face from the end wall.

* * * * *